(12) United States Patent
Dance

(10) Patent No.: US 6,670,571 B2
(45) Date of Patent: Dec. 30, 2003

(54) SURFACE MODIFICATION

(75) Inventor: Bruce Guy Irvine Dance, Cambridge (GB)

(73) Assignee: The Welding Institute, Cambridge (GB)

(*) Notice: Subject to any disclaimer, the term of this patent is extended or adjusted under 35 U.S.C. 154(b) by 0 days.

(21) Appl. No.: 10/150,905

(22) Filed: May 17, 2002

(65) Prior Publication Data

US 2003/0006217 A1 Jan. 9, 2003

(30) Foreign Application Priority Data

May 18, 2001 (GB) .............................. 0112234

(51) Int. Cl.⁷ ..................... B23K 15/00; B23K 26/38
(52) U.S. Cl. .................... 219/121.18; 219/121.71
(58) Field of Search .............. 219/121.6, 121.65, 219/121.66, 121.67, 121.68, 121.69, 121.7, 121.71, 121.72, 121.78, 121.79, 121.12, 121.16, 121.17, 121.18, 121.19, 121.2

(56) References Cited

U.S. PATENT DOCUMENTS

| | | | |
|---|---|---|---|
| 3,246,079 A | 4/1966 | Teucher | 178/6.6 |
| 3,632,398 A | 1/1972 | Konig | 117/93.3 |
| 4,806,731 A | 2/1989 | Bragard et al. | 117/93.3 |
| 5,223,692 A * | 6/1993 | Lozier et al. | |
| 5,225,650 A | 7/1993 | Babel et al. | 219/121.69 |
| 5,324,912 A | 6/1994 | Boppel et al. | 219/121.19 |
| 5,550,346 A * | 8/1996 | Andriash et al. | |
| 5,593,606 A | 1/1997 | Owen et al. | 219/121.71 |
| 5,609,779 A | 3/1997 | Crow et al. | 219/121.71 |
| 5,916,462 A | 6/1999 | James et al. | 219/121.71 |
| 6,144,007 A * | 11/2000 | Levin | |
| 6,359,255 B1 * | 3/2002 | Yamamoto et al. | |
| 6,433,305 B1 * | 8/2002 | Liu et al. | |

FOREIGN PATENT DOCUMENTS

| | | |
|---|---|---|
| EP | 07577833 A | 1/1994 |
| GB | 2 069 906 A | 2/1980 |
| GB | 2 029 308 A | 3/1980 |
| GB | 2 252 068 A | 7/1992 |
| GB | 0626228 A1 | 11/1994 |
| JP | 9066325 | 3/1997 |
| WO | WO86/07568 | 12/1986 |
| WO | WO95/00774 | 3/1995 |
| WO | WO95/07775 | 3/1995 |

OTHER PUBLICATIONS

Patent Abstracts of Japan vol. 008, No. 100 (M–295), May 11, 1984, JP 59 013588, Jan. 24. 1984, Abstract.
Patent Abstracts of Japan vol. 012, No. 416 (M–759), Nov. 4, 1988, JP 63 154279 Jun. 27, 1988, Abstract.
Alvensleben F. Von et al.: "Nd: Yag–Laser setzen sich in Nikrobereih durch" Technische Rundschau, Hallwag Verlag. Bern, CH, vol. 83. No. 37.

* cited by examiner

Primary Examiner—Samuel M. Heinrich
(74) Attorney, Agent, or Firm—Martin Novack

(57) ABSTRACT

A method of operating on a workpiece comprises causing relative movement between the workpiece and a power beam in a traverse direction so as to expose a series of locations on the workpiece to the power beam. At each location the power beam is caused to move relative to the workpiece in a predetermined manner having a component transverse to the traverse direction, and workpiece material is melted and displaced by the power beam so as to form a cavity or hole.

46 Claims, 8 Drawing Sheets

SURFACE MODIFICATION

This invention relates to a method of operating on a workpiece, for example to modify or prepare a surface topography of the workpiece or parent material in order to increase the degree of mechanical friction or the degree of mechanical interlock with respect to another material or body, or to create holes in the workpiece.

Various methods have been used to increase the surface roughness of materials which have been made relatively smooth by machining, polishing, forming against a flat mould and so forth. These roughening methods include surface deformation by mechanical means such as grooving or knurling, or chemical means such as etching.

Alternatively, material has been added to the parent material surface by means, for example, of arc welding with a consumable filler wire. In one example small drops of metal have been deposited onto a metal surface, utilising the consumable electrode gas metal arc (GMA) process in which the current is modulated such that molten drops are detached from the melting wire electrode in a discrete and regular manner. These drops serve as raised dimples on the otherwise relatively smooth parent material surface and have been used to reduce the tendency to slip between the parent and another body.

EP-A-0626228 describes a method of modifying the surface of a workpiece which is to be joined to another member comprises exposing a series of locations on the workpiece surface to a power beam whereby at each location workpiece material is melted and spaced laterally under the influence of the power beam and then allowed to solidify so as to form a cavity surrounded by an area of solidified material which is raised with respect to the adjacent workpiece surface and has a re-entrant profile.

In accordance with a first aspect of the invention, we provide a method of operating on a workpiece, the method comprising causing relative movement between the workpiece and a power beam in a traverse direction so as to expose a series of locations on the workpiece to the power beam; and at each location causing the power beam to move relative to the workpiece in a predetermined manner having a component transverse to the traverse direction, whereby at each location, workpiece material is melted and displaced by the power beam so as to form a cavity or hole.

The advanced texturing technique claimed here differs fundamentally from the previously known and applied method. In the advanced form, the power beam is specifically caused to move (manipulated) in a predetermined manner at each location, instead of being static. The power beam may be pulsed so as to expose each location, although preferably it is continuous. The typically relatively small, high frequency "secondary deflection" motions of the beam at each location have the effect of markedly altering the redistribution of the molten material generated at each location. In general the movement of the beam is predetermined by an initial step of selecting the desired movement.

The invention can be used to form cavities in the surface of the workpiece or to create holes, typically extending through the workpiece. The formation of a hole can be carried out with or without a backing substrate. Furthermore, when a cavity or hole is formed, preferably the step of causing the beam to move in the predetermined manner is performed after the cavity or hole has been formed. This enables the shape of the cavity or hole to be accurately determined. In many cases a manipulation step may also be used during the cavity/hole formation where the diameter of the cavity/hole exceeds that of the beam.

The secondary deflection is preferably at such a frequency that at least one complete pattern repeat (or at least direction reversal) is performed at each location, and preferably an integer number of repeats is carried out at each position. For 1000 holes per second in steel, a secondary frequency of approximately 1000 Hz, 2000 Hz or 3000 Hz is appropriate. In this case the cavities would be ~0.5 mm in depth and width, on a 0.7 mm pitch. Higher secondary frequencies may be required with smaller diameter cavities, and the material properties also influence the optimum frequency.

The "secondary deflection" used may take various forms, including circular, linear, ellipsoidal and/or simple geometric figure shaped motions, each having at least a component in the direction transverse to the traverse direction. The secondary deflection may also be combined with other suitable variations of temporal and spatial beam power density distribution (e.g. pulsing of beam current and/or varying the beam focus position) to achieve the desired effect and allow finer control over the cavity or hole formation process.

In general, the duration of the beam's interaction is carefully controlled so that the secondary beam deflection is consistently applied at each location, i.e. the secondary and primary beam motions are correctly phased in relation to one another so that the texturing effect is reproducible and does not vary in a non-systematic fashion.

In the case of cavity formation, suitable raised portions or dimples with re-entrant profiles may be generated on the otherwise comparatively smooth material surface from the parent material by rapidly melting small localised regions by means of a (typically focussed) power beam such as an electron beam impinging on the parent material. The high power density beam is rapidly moved from point to point to produce a series of such raised dimples. By closely spacing the dimples a semi-continuous line or ridge can be produced. It is noted that the raised material comes from melting and displacing the molten material, thus leaving a small cavity in the parent. Some material may be lost by vaporisation under the high power density of the applied beam.

In use, when a workpiece provided with cavities is adhered to another member, both the cavity and the raised dimple can contribute to mechanical interlock.

The adhesion to textured surfaces of materials from the vapour phase is also modified and enhanced.

The re-entrant profile further increases the mechanical forces required to separate the parent from, or slide the parent over, another member.

The re-entrant profile is beneficial in retaining, for example, an adhesive, especially an adhesive which does not itself bond to the parent, or only bonds with a low strength. Alternatively the bond strength between a non-adherent material, e.g. a low friction polymer, and the parent material surface may be increased substantially by the interlocking nature of the re-entrant profile.

In addition, the processed surface is substantially cleaned and freed from any minor contamination by the action of the beam, this increasing the bond strength obtained with any subsequent adhesive bonding operation.

Where a series of closely spaced dimples form a semi-continuous ridge, this ridge preferably also has a re-entrant profile.

For the purposes of increasing the overall bond strength of an adhesive, it is also noted that the adhesive preferably also enters the cavity as well as the re-entrant surface on the dimple to increase its bonding shear strength.

Preferably the surface topography utilises the existing parent material so no additional material is deposited onto the parent. The technique of changing the surface topography relies on utilising the melting/vaporisation capability of a power beam or high power density heat source typically brought to a focus in the region of the work surface.

Preferably a portion of the movement in the predetermined manner causes an area adjacent the location to be heated. Such an area may surround the particular location or may constitute another location. The adjacent location may be heated either before or after the formation of the cavity or hole, so as to effect a pre-formation or post-formation heat treatment respectively. The workpiece surface in the adjacent region can be either heated to below or above its melting point.

The form of the predetermined movement at the location may be similar to that of the portion of the predetermined movement at the adjacent location. However, typically, these have a different form, for example, the portion of the predetermined movement may take a raster form. In another example the area surrounding a cavity is heated by a circular movement of the beam. Typically the heating portion of the predetermined movement occupies about 30% of the time spent by the beam at a location.

The heating of an adjacent location is advantageous in that it can be used to control the cooling rate of the material and in that it produces improved adhesion of molten material to the workpiece surface. Pre-heating also allows the achievement of better synchronisation between the beam movements in the traverse and transverse directions.

The locations are typically spaced such that the material displaced from adjacent locations is in contact. The timing of the beam movements is also preferably controlled such that the material from the adjacent locations remains molten and coalesces during such contact. This coalescence allows a greater range of shapes and sizes to be achieved in the re-entrant features as these features are dependent upon surface tension forces within the ejected material and the temperature (cooling rate). The secondary deflection of the beam is therefore used to control the ejection of material, whereas pre/post-heat treatments can be employed to control the cooling rate.

In the preferred example, the power beam comprises an electron beam. Typically, this will be generated in a conventional manner using a conventional electron gun, the beam being moved across the workpiece under computer control using a technique similar to that described in U.S. Pat. No. 5,151,571 incorporated herein by reference. Typically, the power and speed of movement of the beam is such that more than 500 cavities per second are formed, preferably up to 580 or more cavities per second. The relative speed of movement between the beam and the workpiece is typically up to 1 km/s while the transit time between cavities is typically $\frac{1}{100}$th of the dwell time at each cavity. The peak power density of the electron beam is typically in the range $10^5$–$10^7$ W/mm$^2$.

Cavities have been made at a range of speeds and sizes. The slowest speed is well below 400/second and there is no practical upper limit to the speed—for example 10000/second can be achieved in some materials, and more than that is certainly possible.

The shape of the beam may be important and preferably the current in the beam annulus is at least half the current in the central portion, and more especially at least equal to the central current. Satisfactory results are obtained when the current in the annulus is twice or even three times the central current, depending on the parent material and type of dimple desired.

In other applications, other power beams could be used, for example a laser. With a laser, typically a slightly higher net energy is required per cavity in contrast to an electron beam, owing to the reduced coupling efficiency with the workpiece. Actual laser pulse durations may be shorter than with electron beams, and correspondingly the peak energy density may be slightly higher. Cavities of similar size can be produced at a rate of 20 per second using a 300W mean output pulsed $CO_2$ laser, giving about 15 joules per cavity.

Potentially any size of cavity or hole can be produced, for example ranging from those with diameters/depths of the order of millimeters to less than 10 micrometers. The minimum diameter of each cavity/hole is determined by the beam diameter, whereas large diameters can be achieved using a large beam diameter and an appropriate secondary deflection. Typically, the holes or cavities have a maximum diameter of substantially 0.6 mm and a depth in the range 0.6–1 mm. In the preferred case, the cavity or hole pitch is about 1 mm.

The dimensions of each cavity or hole set out above will be reduced by the intrusion of remelted material producing a re-entrant feature.

In some cases, the cavities or holes can have a substantially similar form and can then be arranged in either a square or close-packed arrangement. However, cavities or holes of variable size may be produced allowing other patterns of cavities to be formed.

In some cases, textures containing re-entrant and non-re-entrant features could be combined with the production of through holes rather than blind holes. The distinction between this and the known art of EB drilling is in the reliance of the process on its controlled displacement of some or all of the melted material rather than on its complete removal as in classical EB drilling. The control and implementation of this process would be in the secondary beam deflection, to control the timing and extent of the beam's penetration through the material. Partial ejection of material following penetration would occur, using a volatile backing material in the normal way, followed by a controlled melting and displacement of peripheral material to give the edge profile desired.

Typically, the workpiece is any metal or other material which can be melted or vaporized by the power beam. An example is steel. Non-metals may also be processed even though they are not electrically conductive. For example, re-entrant features can be produced in ceramics such as quartz and alumina, glasses, polymers, and composites. The mechanism is the same, save in some polymers, in which more of the material is vaporised.

In accordance with a second aspect of the present invention, a method of joining a workpiece to another member comprises preparing a surface of the workpiece using a method according to the first aspect of the invention to form one or more cavities in the surface of the workpiece; and adhering another member to the prepared surface of the workpiece.

This method is useful in a number of applications. In particular, the other member can be any polymer or other material which can be successfully introduced by any combination of pressure, heat or chemical reaction into the cavities in a chosen substrate or workpiece. For example, the other member could comprise one of nylon, PTFE, PMMA, aluminium and its alloys, phenolic resins, and magnesium and its alloys.

Examples of important applications of the invention include adhering brake pads to metal brake pad backings; bonding low friction polymers to corrosion-resistant metals for manufacture of prosthetic devices, for example hip joints etc; bonding of rubber to steel or other metals, for example for manufacture of impact-absorbing buffers; and bonding of aluminium to steel or cast iron, for example for the manufacture of lightweight brake disks.

Some examples of methods according to the invention will now be described with reference to the accompanying drawings, in which.

Figure 1:
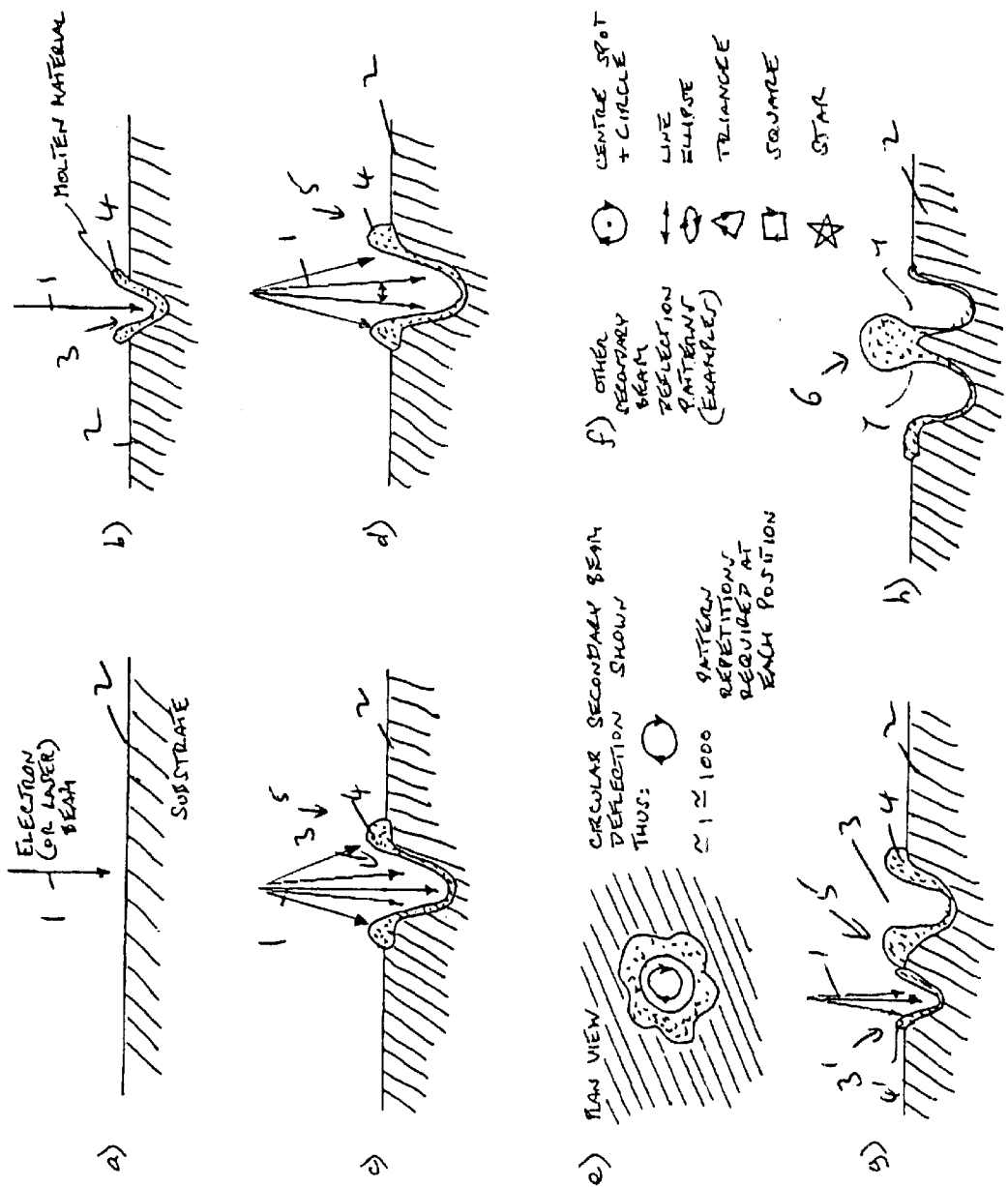
FIGS. 1a–1h show successive stages in the formation of a cavity with a re-entrant feature.

FIGS. 1a–1h illustrate successive stages in the formation of a cavity with a re-entrant surface feature. At the start, an electron or laser beam 1 impinges on a substrate such as a steel workpiece 2. Subsequently (FIG. 1b) a vapour filled cavity 3 begins to form with molten material 4 being displaced laterally outwardly. After further exposure, more molten material 4 is displaced and the beam is deflected to form an extended molten zone 5 at the surface (FIG. 1c). The beam 1 is further deflected (FIG. 1d) thus displacing further molten material 4 to form an extended molten zone at the surface.

The deflection can take a variety of forms as shown in FIGS. 1e and 1f. Typically, it follows a closed locus and may be repeated a number of times.

The beam 1 then moves to a second location and begins to form a second cavity 3' (FIG. 1g) thus displacing further molten material 4'. This further molten material 4' overlaps with the previous material in an adjacent zone 5 and then subsequently solidifies into a quasi-spherical profile under the forces of surface tension as indicated at 6 in FIG. 1h thus forming the re-entrant feature 7.

Figure 2A:
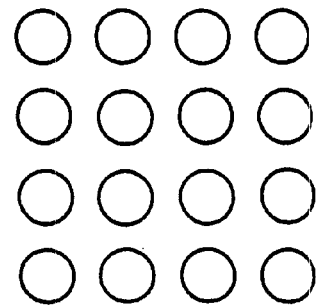
FIGS. 2A–2C illustrate three different arrangements of cavities.
Figure 2B:
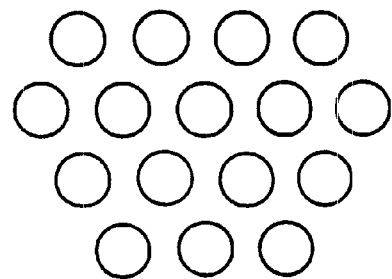
Figure 2C:
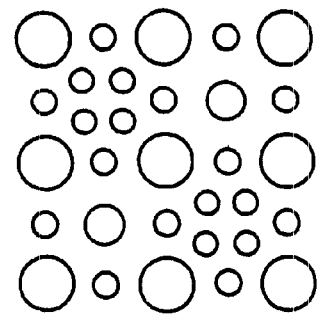

In general, each cavity will have a similar shape and form and the cavities may be arranged as shown in FIGS. 2A (square) or 2B (close-packed). However, it is not essential for the cavities to be the same size and, as shown in FIG. 2C, a variety of different sizes allow a higher pattern density to be achieved.

Typical parameters for the electron beam are as follows:

For texturing of steel, with a beam of 140 kV acceleration potential, and 42 mA beam current, giving a power of ~5.8 kW, the beam would be focussed to a diameter of ~0.4 mm and would make ~580 holes/sec in the workpiece. Examples of suitable deflection frequencies are set out above. In this case, the peak beam power density would be in the region of $10^5$–$10^7$ W/mm². Each hole would be made with ~10 joules energy, in ~1.7 ms. The transit time of the beam from one hole position to the next is typically $\frac{1}{100}$th of the dwell time at the hole position, i.e. in this case ~17 μs. Since the beam may be travelling at speeds of ~1 km/s over the workpiece surface, it need not be switched off or reduced in power whilst in transit, as no surface melting or other damage is likely at these scanning speeds in any event.

In steel, cavities produced with 10 joules are ~0.6 mm depth below the original surface. These dimensions are reduced in each cavity by the intrusion of re-melted material, so giving the re-entrant features. The pitch of the cavities would typically be ~1 mm.

Similar cavities may be produced with lasers; typically a slightly higher net energy is required per cavity, owing to the reduced coupling efficiency with the substrate. Actual laser pulse durations may be shorter than with electron beam, and correspondingly the peak energy density may be slightly higher. Cavities of similar size can be produced at a rate of 20 per second using a 300W mean output pulsed $CO_2$ laser, giving ~15 joules per cavity.

Figure 3:
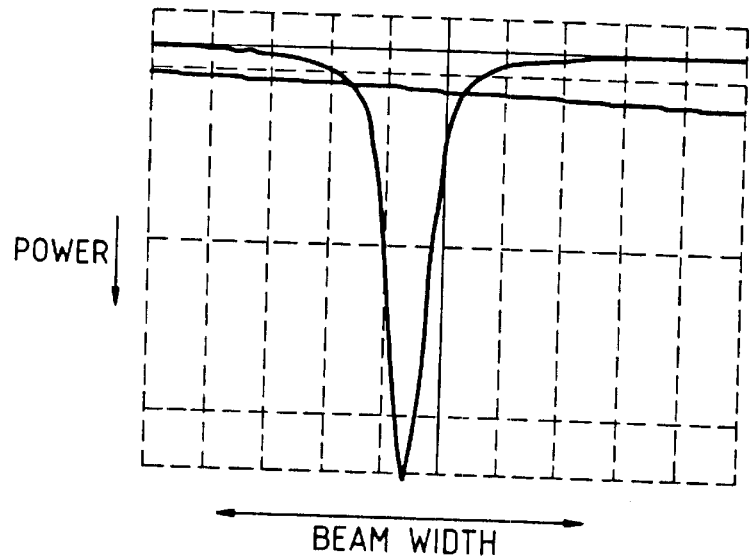
FIG. 3 shows an example of an electron beam power density distribution.

In the preferred example, the power distribution across the electron beam 1 has a form similar to that shown in FIG. 3 which is based on a 5 kw electron beam. Thus, there is a relatively high peak power density at the centre with a diameter of about 0.6 mm but a significant fringe power region. The width of the beam at half maximum is 0.25–0.3 mm.

In the case of an electron beam, many different types of electron beam guns could be used to generate the beam. In a typical electron gun, a cathode of refractory metal is heated to ~2000° C. in a vacuum of $10^{-5}$ to $10^{-6}$ mbar. A potential of 30–150 kV accelerates the beam through a hollow anode. In a triode gun, the beam current is controlled by a third "bias" or "Welnhelt" electrode. In a diode gun, the beam current is controlled by the temperature of the cathode alone.

The beam passes through a system of magnetic lenses etc. which may incorporate a magnetic trap (a device that can protect the gun from the ingress of unwanted material), and deflection coils which can manipulate the beam at high speed. The working environment of beam may be a vacuum of as little at $10^{-1}$ mbar, typically $5\times10^{-3}$ mbar. The vacuum level has an effect on beam quality and intensity.

Cathodes can be either directly heated or indirectly heated. Directly heated cathodes require replacement at intervals of (say) 10–100 hours, an operation which takes (typically) ~15 minutes to accomplish. Indirectly heated cathodes are far more long lived, typically operating for hundreds of hours before requiring replacement.

Beam quality can be monitored in real-time by use of (say) a slit probe device. This has the potential to be linked to the electron beam control systems as an automatic system.

In one example, the workpiece can be processed as a continuous strip using a conventional air-to-vacuum-to-air system which has been successfully built for applications such as the manufacture of saw blades, in bimetal strips etc.

Figure 4:
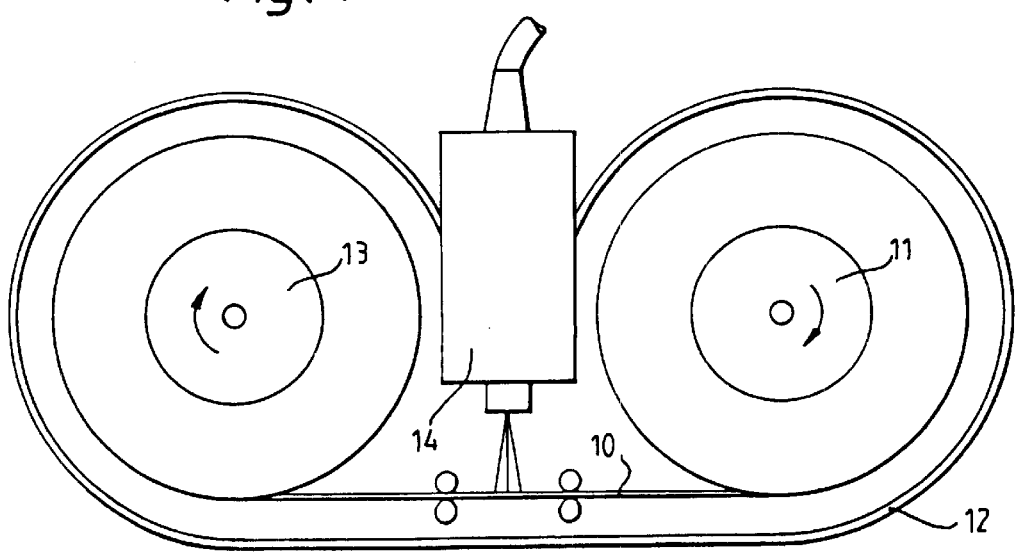
FIG. 4 illustrates schematically apparatus for carrying out the method.

An alternative approach is to process reels of strip material individually (FIG. 4), so that the blank material 10, on a reel 11, is loaded into a specially designed vacuum chamber 12, together with an empty take-up reel 13. These reels 11,13 would necessarily be quite large in diameter if the material is not to take a "set". For example, the minimum pure bend radius to give 0.2% strain in 7 mm thickness material is 1750 mm. A reel with a radius of 2.5 m would therefore be able to hold up to 6 tonnes of 80 mm wide strip—a length of 1.4 km. With a 5 kW gun 14, a lm/min processing speed is possible, meaning that such a reel would take about 24 hours to process. However, if texturing speed is increased proportionately to gun power the with a 50 kW gun, processing at 10 m/min, such a reel would be processed in ~2½ hours.

Figure 5:
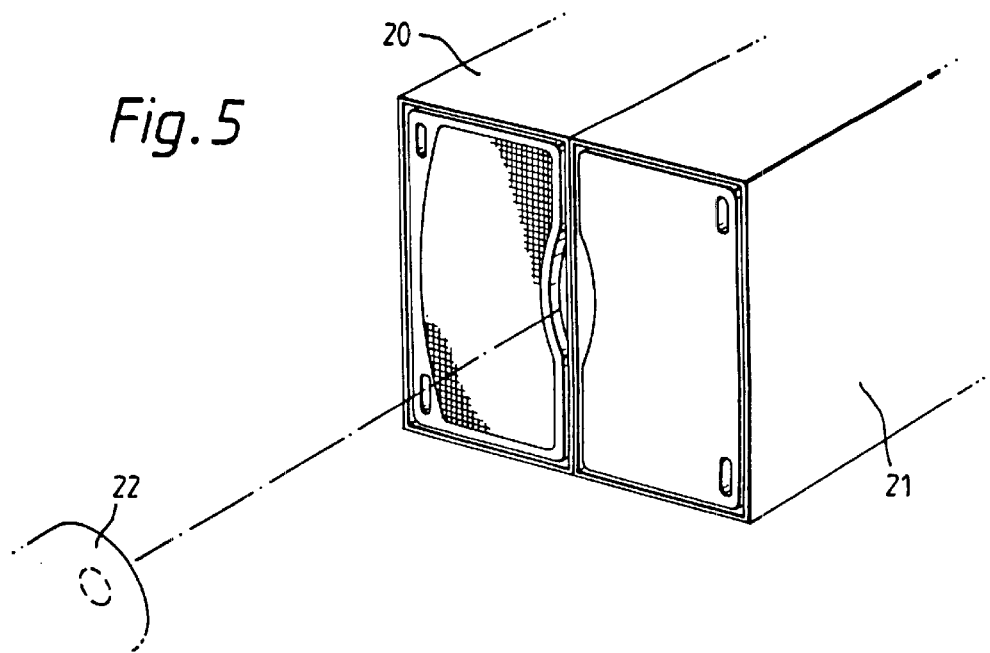
FIG. 5 illustrates part of a second example of apparatus for carrying out the method.
Figure 6:
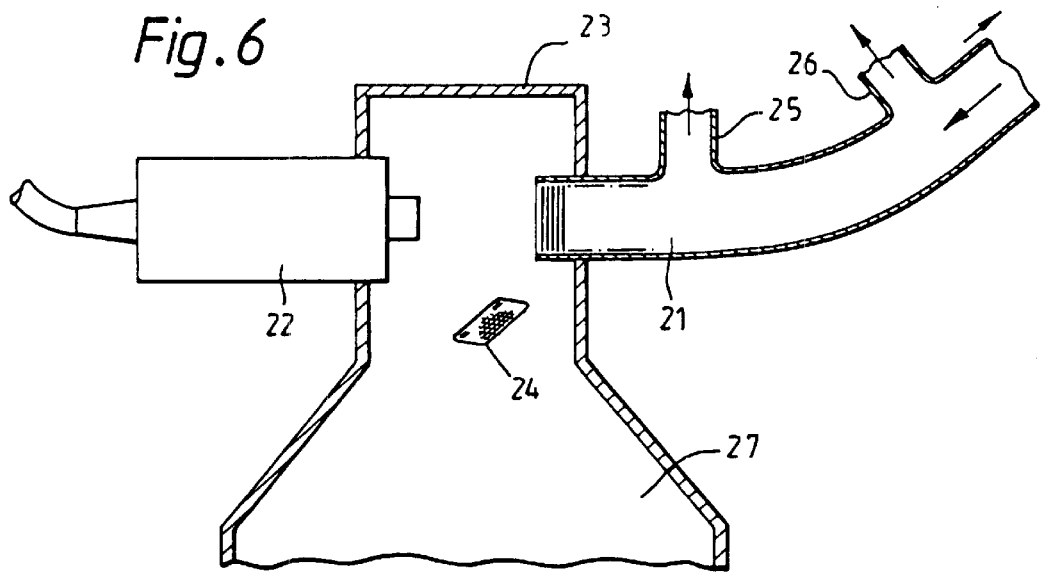
FIG. 6 illustrates the apparatus of FIG. 5 in more detail.

A preferred route, however, from the point of view of integrating the electron texturing technique with existing production practice, would be to texture individual workpieces such as brake pad backing plates (PBP). An example of apparatus for achieving this is shown in FIGS. 5 and 6. Two chutes 20, 21 are mounted side by side (only one shown in FIG. 6) and two stacks of PBPs are fed down the chutes towards an electron gun column 22 such that both lie within a deflection field. The outlets of the chutes 20, 21 are located in an evacuated chamber 23. Whilst one PBP is being removed after processing, the other is being processed. This means that the available beam power can be utilised fully by being operated continuously. In addition, unlike other techniques, this would readily enable each PBP to be selectively textured only when it is required. Texturing selected areas of conventional PBPs with holes in already would also be possible.

In practice, stacks of PBPs could be loaded continuously into each chute so that the chute's sidewalls act as an effective vacuum seal. To facilitate this, every 100th PBP or so could be a blank dummy, exactly fitting the chute dimensions perhaps with the assistance of an "0" ring to maintain a vacuum seal. Air exits from the chutes as shown at 25, 26 are provided to maintain vacuum, the exits being connected to a vacuum pump (not shown).

After texturing, the PBPs could simply fall into a hopper 27 which would be emptied at regular intervals.

Once a workpiece with a prepared surface has been formed, it can then be joined using adhesive to another member in a conventional manner. As previously explained, the textured surface will considerably enhance and strengthen the joint and indeed will enable certain materials to be joined using adhesive which previously could not be joined.

The examples described so far illustrate the formation of blind holes or cavities in the surface of the workpiece. The invention can also be used to form through holes.

Figure 7:
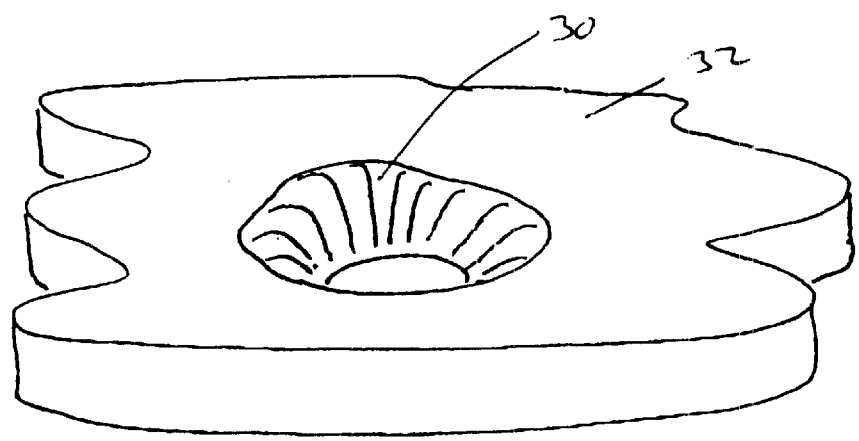
FIG. 7 illustrates an asymmetric penetrating hole.

FIG. 7 illustrates the formation of an asymmetric penetrating hole 30 in a workpiece 32.

Figure 8:
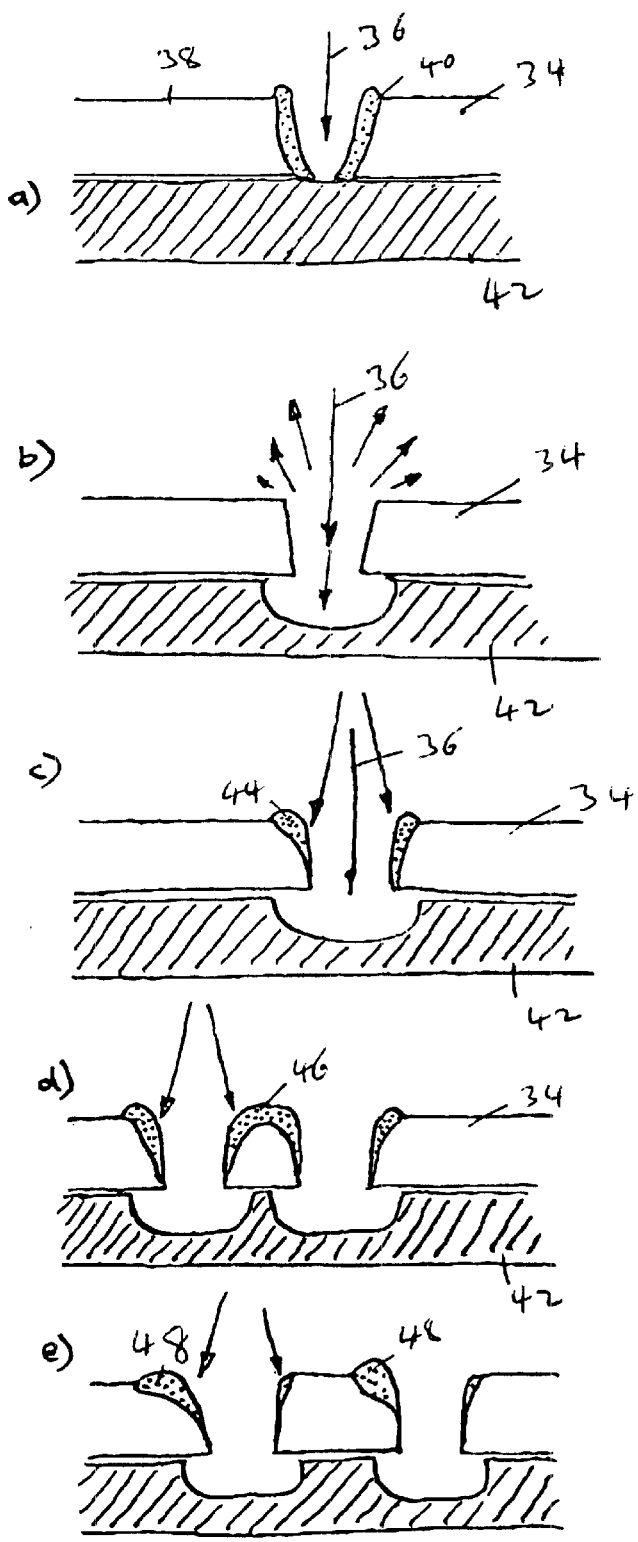
FIGS. 8a–8e illustrate successive stages in the formation of a through hole using a backing substrate.

FIG. 8 illustrates in more detail the formation of a through hole in a workpiece 34. Initially, an electron or laser beam 36 is focussed onto a surface 38 of the workpiece 34 so as to penetrate the substrate and start to enter the backing material (FIG. 8*a*). Optionally, the beam 36 can be deflected at very high frequency so as to "shape" the beam for non-circular, non-beam-shaped holes. As the beam 36 penetrates the workpiece 34, a region of liquid metal/substrate 40 is formed along the sides of the hole.

As soon as the beam impacts on the backing substrate 42 (typically made of silicon rubber or other volatile material), a small gas explosion will occur which causes most or nearly all molten material 40 to be ejected leaving sharp edges to the hole. (FIG. 8*b*).

The beam 36 is then deflected at a lower frequency (FIG. 8*c*) to melt the hole periphery and to displace new/existing melted material 44 in a controlled fashion. Further vapour from the backing substrate 42 assists the metal/substrate flow if required.

Adjacent holes can be formed in a similar manner (FIG. 8*d*) to create overlapping molten zones 46 so as to produce curved re-entrant or other shaped holes.

Alternatively, asymmetric molten zones 48 (FIG. 8*e*) can be formed which can be either overlapped or not as required. The hole asymmetry is generated via controlled beam deflection.

Figure 9:
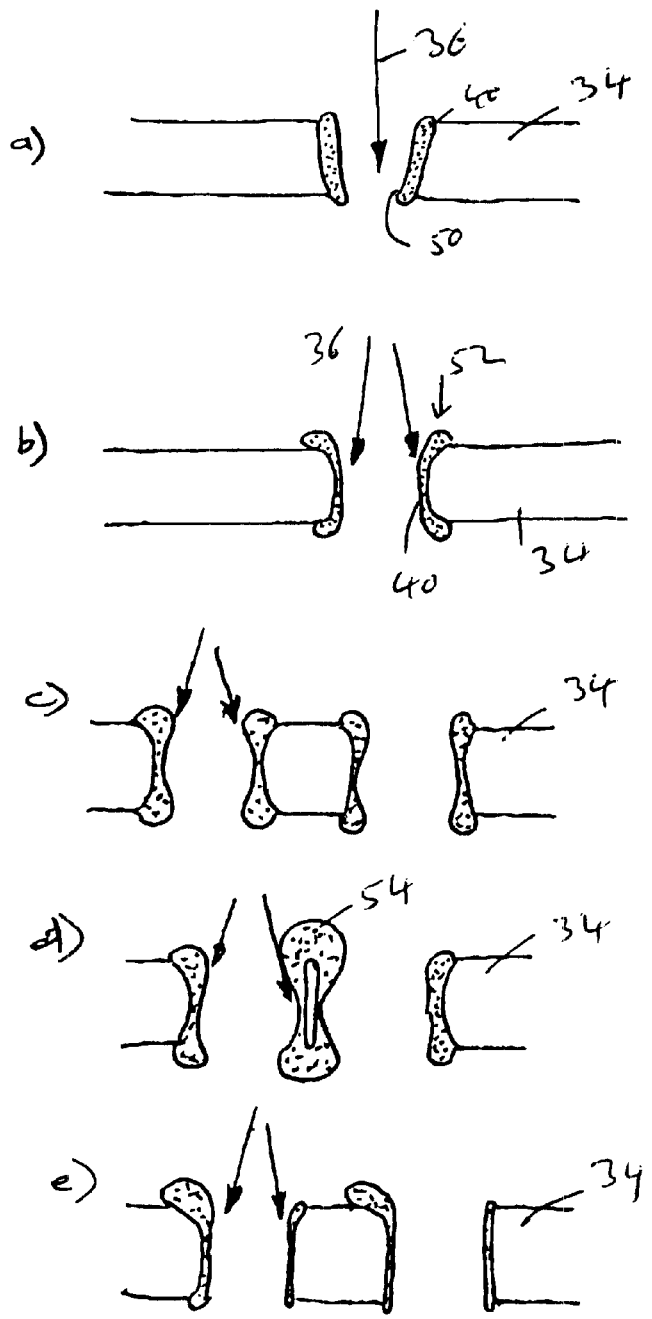
FIGS. 9a–9e illustrate successive stages in forming a through hole without a backing substrate.

FIG. 9 illustrates the formation of a through hole without the use of a backing layer. Thus, in FIG. 9*a* a beam 36 impinges on a workpiece 34 to form a hole 50 with molten material 40 along its sides. The beam 36 will be deflected at very high frequency so as to "shape" the hole.

The beam is then deflected at an intermediate frequency (FIG. 9*b*) to extend, shape and displace molten material 40 at a peripheral zone 52.

Further, non-overlapping symmetric re-entrant holes could be formed in a similar manner (FIG. 9*c*) or alternatively the holes could be located close to one another so as to generate overlapping, molten regions 54 defining reentrant features. In a further alternative (FIG. 9*e*) non-overlapping asymmetric holes can be produced.

In the examples shown in FIGS. 8 and 9 hole formation could be carried out at rates of about 1000 per second. The initial deflection frequency (FIGS. 8*a* and 9*a*) will typically be in the range 100 KHz–2 MHz while the subsequent "profile" shaping deflection frequency used at the stages shown in FIGS. 8*b* and 9*b* will be in the order of 1 KHz–100 KHz.

In some cases, the electron or laser beam 1 can be used to preheat areas prior to texturing/perforation and typically being defocussed. Thus, the beam can be time shared between these tasks allowing both to be carried out substantially simultaneously.

Figure 10:
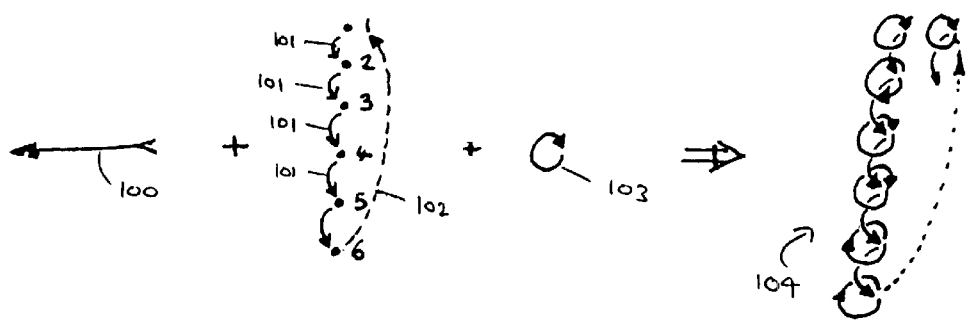
FIG. 10 illustrates the summation of relative beam movements.

FIG. 10 shows how a series of cavities can be formed in a workpiece by the summation of a number of movements of the beam. The arrow 100 denotes the relative movement of the workpiece with respect to the electron gun.

The beam traverses the workpiece between a number of locations along a substantially linear path. This traverse direction or "primary deflection" is shown by the arrows 101. This traverse is repeated throughout the operation, as indicated by the arrow 102. The curved arrow 103 indicates the orbital motion (secondary deflection) of the beam which, when applied, causes the cavities to have the desired form.

It should be remembered that the travel time between locations is typically about ¹⁄₁₀₀ of the time spent at each location and therefore the movements indicated at 101 are much more rapid than the relative motion of the workpiece 100, or the orbital secondary deflections 103.

By summing the three movements mentioned above and with appropriate control of their relative frequencies, a combined motion of the beam in relation to the workpiece, generally indicated at 104 in FIG. 10, is generated.

Figure 11A:
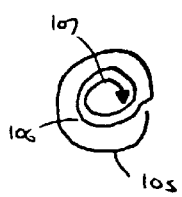
FIG. 11a shows a circular pre-heat treatment of a location.

FIGS. 11*a*–11*d*, show the use of various secondary deflections in pre/post-heat treatments. In FIG. 11*a*, a loop pre-heat is shown in which, prior to cavity formation, the beam firstly follows a circle 105, the circle lying outside the circumference of the final cavity. The beam is then moved in two circles 106, 107 of smaller diameter to actually form the cavity.

Figure 11B:
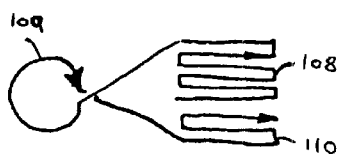
FIG. 11b shows a raster pre-heat treatment of an adjacent location.

FIG. 11*b* shows a raster preheat where part of an adjacent location (for later cavity formation) is first pre-heated with a raster movement 108. The cavity at the actual location is then formed using a circular beam path at 109. The remaining part of the adjacent location is then pre-heated with a further raster movement at step 110.

As the beam movements are very rapid, the series of locations in the line next to those currently experiencing cavity or hole formation can therefore be pre-heat treated. The high speed of the process results in little loss of pre-heat temperature by the time that the respective cavity/hole is formed after pre-heat treatment.

Figure 11C:
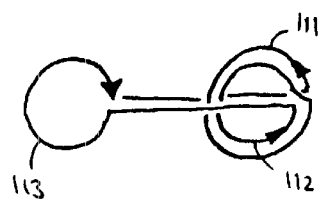
FIG. 11c shows a circular post-heat treatment of an adjacent location.

FIG. 11*c* shows a suitable secondary deflection for a loop post-heat treatment. The circles 111, 112 denote beam movements for first forming a cavity, after which the beam is deflected so as to follow a circular path 113 in another location where a cavity was formed earlier.

Figure 11D:
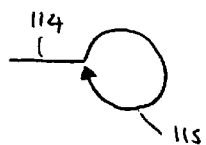
FIG. 11d shows a linear pre-heat treatment of a region between locations.

FIG. 11*d* shows a further example of a pre-heat treatment which is particularly beneficial for the formation of large agglomerations of ejected material. The beam is firstly moved in a line 114 towards a location in which a cavity is to be formed. This line extends for most of the distance from the lines of adjacent locations defining the previous primary beam deflection path. The surface of the workpiece is melted in the vicinity of the line.

The beam then follows a circular path 115 to effect the formation of the cavity. When this is performed at a suitable speed the ejected material from the previously formed line of cavities remains molten. The ejected material from groups of cavities therefore coalesces by surface tension forces to create large features in the interstices between the cavities.

Some further example conditions for forming cavities using an electron beam are shown in the table below.

| Parameter | Example 1 | Example 2 |
|---|---|---|
| Material | Stainless Steel 316L | Aluminium Alloy AA3004 |
| Texture Type | Medium Depth | Deep |
| Re-entrant Features | Yes | Yes |
| Primary-Secondary Deflection Phase locking | Yes | No |
| Accelerating Voltage (kV) | 130 | 120 |
| Beam Current (mA) | 20 | 29 |
| Beam Diameter - 90% current (mm) | 0.3 | 0.6 |
| Pressure (mbar) | 0.001 approx | 0.001 approx |
| Working Distance - from lens pole piece gap (mm) | 334 | 400 |
| Primary Deflection Pattern Width (mm) | 40 | 41 |
| Number of Cavities per Primary Repeat | 60 | 24 |
| Primary Deflection Repeat Frequency (Hz) | 40 | 36 |
| Secondary Deflection Pattern Type | Triple Circle | Single Circle |
| Secondary Deflection Pattern Size (mm) | 0.33 | 0.5 |
| Secondary Deflection Repeat Frequency (Hz) | 2400 | 5100 |
| Work Feed Rate (mm/min) | 2200 | 3930 |
| Cavity Formation Rate (/second) | 2400 | 864 |
| Energy Input (Joules/Cavity) | 1.03 | 4.03 |
| Area Coverage Rate (mm$^2$/second) | 1467 | 2686 |

What is claimed is:

1. A method of operating on a workpiece, the method comprising causing relative movement between the workpiece and a power beam in a traverse direction so as to expose a series of locations on the workpiece to the power beam; and at each location causing the power beam to move relative to the workpiece in a predetermined manner having a component transverse to the traverse direction, whereby at each location, workpiece material is melted and displaced by the power beam so as to form a cavity or hole.

2. A method according to claim 1, further comprising initially selecting the manner of movement of the power beam such that the beam is caused to move in a controlled predetermined manner.

3. A method according to claim 1, wherein when a hole is formed at each location, the hole has an asymmetric shape with respect to the nominal direction of the power beam.

4. A method according to claim 1, wherein when a hole is formed at each location, the workpiece is located on a backing substrate, the power beam passing through the hole in the workpiece and impacting on the backing substrate.

5. A method according to claim 1, wherein, when a hole is formed at each location, the movement of the beam in the predetermined manner is performed before or after the hole has been formed.

6. A method according to claim 1, wherein the predetermined movement comprises a secondary deflection such as a circular, linear, ellipsoidal and/or simple geometric figure shaped motion.

7. A method according to claim 6, wherein the power beam is deflected at a first frequency to create a hole or cavity and then at a second different frequency.

8. A method according to claim 1, wherein the beam manipulation includes one or more of a temporal or spatial modulation of the power beam density distribution.

9. A method according to claim 1, further comprising melting and displacing the solidified material to obtain a desired edge profile.

10. A method according to claim 1, wherein at each location, workpiece material is melted and spaced laterally under the influence of the power beam and then allowed to solidify so as to form a cavity or hole surrounded by an area of solidified material which is raised with respect to the adjacent workpiece surface.

11. A method according to claim 1, wherein the cavities or holes are formed in the workpiece at a rate of at least 500 per second.

12. A method according to claim 11, wherein the cavities or holes are formed in the workpiece at a rate of at least 580 per second.

13. A method according to claim 1, wherein the power beam moves between locations at a rate of about 1 km/s.

14. A method according to claim 1, wherein the transit time between locations is about 1/100th of the dwell time at each location.

15. A method according to claim 1, wherein the cavities or holes have a maximum diameter of about 0.6 mm.

16. A method according to claim 1, wherein the cavities or holes have depths in the range 0.6–1 mm.

17. A method according to claim 1, wherein the cavities or holes are spaced apart with a pitch of about 1 mm.

18. A method according to claim 1, wherein the peak power beam density is in the range $10^5$–$10^7$ W/mm$^2$.

19. A method according to claim 1, wherein the cavities or holes have a maximum diameter of less than about 10 micrometers.

20. A method according to claim 1, wherein the cavities or holes have a maximum diameter of less than about 2 mm.

21. A method according to claim 1, wherein the cavities or holes are all of substantially the same size.

22. A method according to claim 1, wherein the cavities or holes are arranged in a square or close-packed array.

23. A method according to claim 1, wherein each hole or cavity has a re-entrant profile.

24. A method according to claim 1, wherein the power beam comprises an electron beam or a laser beam.

25. A method according to claim 1, wherein current in the power beam is distributed across the diameter of the beam such that the current in an annulus of the power beam surrounding a central region of the power beam, the central region having a lateral dimension substantially equal to one third of the beam diameter, is at least half the current in the central region.

26. A method according to claim 25, wherein the current in the annulus is at least equal to the current in the central region.

27. A method according to claim 25, wherein the current in the annulus is two or three times the current in the central region.

28. A method according to claim 1, wherein a portion of the predetermined movement causes an area adjacent the location to be heated.

29. A method according to claim 28, wherein the adjacent area surrounds the location.

30. A method according to claim 28 wherein the adjacent area constitutes another location.

31. A method according to claim 30, wherein the another location is heated before the cavity or hole is formed at the another location.

32. A method according to claim 30, wherein the another location is heated after the cavity or hole is formed at the another location.

33. A method according to claim 28, wherein the said portion of the predetermined movement is of a different form to the predetermined movement at the said location.

34. A method according to claim 28, wherein the said portion of the predetermined movement has a raster form.

35. A method according to claim 1, wherein the locations are spaced such that the material displaced from adjacent locations is in contact.

36. A method according to claim 35, wherein the time period between the formation of the adjacent locations is such that the material displaced from the adjacent locations remains molten and coalesces.

37. A method according to claim 1, further comprising varying the beam focus during the formation of the cavity or hole.

38. A method according to claim 1, wherein the workpiece comprises a metal.

39. A method according to claim 1, wherein the workpiece comprises a brake pad backing plate.

40. A method according to claim 1, wherein the power beam is applied continuously.

41. A workpiece which has been operated upon using a method according to claim 1.

42. A method of joining a workpiece to another member, the method comprising modifying the surface of the workpiece using a method according to claim 1, so as to form one or more cavities in the surface of the workpiece; and adhering the other member to the prepared surface of the workpiece.

43. A method according to claim 42, wherein the other member comprises a polymer.

44. A method according to claim 42, wherein the other member is made of one of nylon, PTFE (polytetrafluoroethylene), PMMA (polymethylmethacrylate), polyurethane, aluminium and its alloys, phenolic resins, and magnesium and its alloys.

45. A method according to claim 42, wherein the other member comprises a brake pad.

46. A method according to claim 1, wherein the material at each location is melted and displaced so as to improve the adhesion between the workpiece and a second material.

* * * * *